US008600884B2

(12) United States Patent
Kim et al.

(10) Patent No.: US 8,600,884 B2
(45) Date of Patent: Dec. 3, 2013

(54) SYSTEM AND METHOD FOR PAYMENT RECEIPT USING 2D CODE

(75) Inventors: Yong-Woo Kim, Seoul (KR); Hye-Jeong Jeong, Seoul (KR)

(73) Assignee: DUZON DASS Co., Ltd., Seoul (KR)

( * ) Notice: Subject to any disclaimer, the term of this patent is extended or adjusted under 35 U.S.C. 154(b) by 501 days.

(21) Appl. No.: 10/598,337

(22) PCT Filed: Jan. 12, 2006

(86) PCT No.: PCT/KR2006/000125
§ 371 (c)(1),
(2), (4) Date: Aug. 24, 2006

(87) PCT Pub. No.: WO2007/004778
PCT Pub. Date: Jan. 11, 2007

(65) Prior Publication Data
US 2008/0228642 A1    Sep. 18, 2008

(30) Foreign Application Priority Data
Jul. 6, 2005   (KR) .......... 10-2005-0060931

(51) Int. Cl.
*G06Q 40/00*  (2012.01)
(52) U.S. Cl.
USPC ................................ 705/40; 705/35
(58) Field of Classification Search
USPC .................................... 705/40, 35
See application file for complete search history.

(56) References Cited

U.S. PATENT DOCUMENTS 5,661,517 A * 8/1997 Budow et al. .............. 725/60
5,845,267 A * 12/1998 Ronen ......................... 705/40
6,289,322 B1 * 9/2001 Kitchen et al. ............. 705/40
7,200,551 B1 * 4/2007 Senez .......................... 705/40
2001/0037297 A1 * 11/2001 McNair ....................... 705/40
2002/0023055 A1 * 2/2002 Antognini et al. .......... 705/40
2003/0191711 A1 * 10/2003 Jamison et al. ............. 705/40

FOREIGN PATENT DOCUMENTS

| KR | 2001-56244 A | 7/2001 |
| KR | 2001-108717 A | 12/2001 |
| KR | 2002-34288 A | 5/2002 |
| KR | 2002-94437 A | 12/2002 |
| KR | 2004-102458 A | 12/2004 |

OTHER PUBLICATIONS

Srivastava, Lara; "Japan's ubiquitous mobile information society"; Info: the Journal of Policy, Regulation and Strategy for Telecommunications, Information and Media; 2004.*
Johnson, Steven J. "Retail Systems: No Longer Business as Usual"; Journal of Systems Management; Aug. 1992.*

* cited by examiner

*Primary Examiner* — Edward Chang
(74) *Attorney, Agent, or Firm* — Sughrue Mion, PLLC

(57) ABSTRACT

A payment receipt system is provided. The payment receipt system comprises: a receipt management database for managing at least information on the payers who have to pay and the payment amount that the respective payers have to pay for a certain period; and a payee server including an information extracting part for extracting information including the information on the payers and the payment amount from the receipt management database, a code converting part for converting the extracted information into a two-dimensional (2D) code, a bill forming part for making out a bill for payment with the converted 2D code attached thereto, a bill transmitting part for transmitting the bill for payment to a receiver of the payer, and a controller receiving information on the payers who have completed a payment from a financial institution server.

19 Claims, 9 Drawing Sheets

SYSTEM AND METHOD FOR PAYMENT RECEIPT USING 2D CODE

This is a national stage application under 35 U.S.C. §371 of PCT/KR2006/000125 filed on Jan. 12, 2006, which claims priority from Korean patent application 10-2005-60931 filed on Jul. 6, 2005, all of which are incorporated herein by reference.

BACKGROUND OF THE INVENTION

The present invention relates to a system and method for payment receipt using a two-dimensional (2D) code, and more particularly, to a system and method for payment receipt, capable of simplifying a settlement process using a bill where a 2D code storing certain information is imprinted.

Generally, the sellers or the service providers have used a billing method (hereinafter, referred to as "OCR method") using an optical character recognition (OCR) card in order to ask the buyers or the service-beneficiaries to pay for the provision of material or immaterial goods, or services, such as electricity, service water, milk, newspaper, security, and so on. A process of the OCR method, in which the sellers or the service providers (hereinafter, referred to as "payee"), who provide goods or services, send a bill to the buyer or the service-beneficiaries (hereinafter, referred to as "payer"), who receive goods or services, and the payer pays for them, is as follows:

First, the payee makes a contract with an authorized institution such as Financial Telecommunications and Clearings Institute (hereinafter, referred also to as "the FTCI") for the use of OCR method so that the payee is assigned a payee code from the FTCI. Also, the payee provides the FTCI with information on the payers who receive goods or services and the like, and is assigned a payer code from the FTCI. In a condition where a payee should bill to a payer, the payee informs the FTCI of the payment amount for a period by the payer registered in the FTCI.

Then, the FTCI makes out information on the payee, payer, payment amount, and payment due with OCR codes, imprints them onto OCR sheet, and provides the payee with the OCR sheet as in the form of a bill. The payee then transmits the bill with OCR codes to the payer by mail and the like.

The payer goes to the financial institution while carrying the bill and cash, pays the payment amount with cash to a receiving teller in the financial institution, together with presenting the bill, and gets a receipt certifying the payment. The financial institution then provides the bill received from the payer to the FTCI.

The FTCI receiving the bill reads out the OCR codes printed in the bill, and sorts information of the bill by the payee, payer, and payment amount. The FTCI provides the financial institution, who has provided the bill, with information on the payee and the payment amount among the sorted information items, and provides the payee with information on the payer among the items.

In addition, the financial institution that has received information on the payee and payment amount from the FTCI remits the payment amount to the account of a financial institution that the payee has previously designated using a method such as a transfer to an account.

Further, the payee who has received information on the payer from the FTCI compares the payer information received from the FTCI with one that the payee has in order to sort the payer who has not paid the payment amount, so that the payee either sends the payer a separate notice of arrears, or asks the same payer to pay for the payment while adding the former payment amount to the next period bill.

However, the OCR method has problems as follows:

First, in order for the payee to use the above mentioned method, the payee should pay a fee both to FTCI and the financial institution that receives the bill. Particularly, since the bill provided from the FTCI is made out through the imprint of OCR ink onto an OCR card, and the OCR card and the ink are expensive to manufacture, the payee has a burden to pay the FTCI a fee including a cost for using an expensive OCR card. Also, in using the OCR method, as seen in the foregoing, many steps should be processed. In particular, considerable periods are consumed in provided an OCR card (a bill for payment) by the financial institution to the FTCI and in reading-out the OCR card and providing read-out information back to the financial institution by the institute. The process period taken between the FTCI and the financial institution consequently delays a time to pay the payee the money paid, so that for the delayed time, money liquidity is decreased, additional financial expenses occur, and a chance to gain a financial income is lost.

Further, since most time limits for payment are designated to month-ends, near the month-ends, the financial institution is crowded with the payers trying to complete the payment so that the payers spend a lot of time waiting to complete the payment as well as the financial institution may have a burden to increase labor costs due to the expanding of separate manpower to receive the payment. Furthermore, since the method provides the payee with the bill using an off-line method such as mail and the like, it takes a long time to deliver, and there is a risk of misdelivery. In this case, although there is such risk of misdelivery, the payer may totally suffer damage caused by non-receipt of the bill, so that the payer always has a fear of suffering accidental damage as well as the payee may have a complaint from the payer.

Meanwhile, in order to solve the problem particularly concerned to the crowdedness of the financial institution at the ends of the months and to labor cost increase, the financial institutions have recently raising weight on using an automated teller machine (ATM). In such case, the financial institution installs the ATM first at the place where it receives the payment. Then, when the payer puts into the ATM the bill for payment and the bankbook, or credit or cash card of the payer, the ATM reads out information on the payment amount among OCR codes written to the bill for payment, and withdraws the payment amount from the account of the bankbook or the card.

However, even by the method, as similar to the above OCR method, there still remains the problems in that the payee should pay a fee both to the financial institution and the FTCI, and it takes a long time until the money paid is transferred to the payee. Further, the OCR method has to use an OCR card, which however, is sensitive to an external damage so that even by slight damage due to an external shock, the ATM cannot read-out the card. In this case, the payer should pay the payment amount directly to the receiving teller in the financial institution.

Further, instead of the prior OCR method, a method for payment receipt using a 2D code has being recently developed. This method is one that instead of transmitting an OCR code made out from the FTCI in its entirety to the payer, the OCR codes are converted into a 2D code and a bill for payment including the converted code is transmitted to the payee. Then, the payer inputs into the ATM the bill for payment where the 2D code is imprinted and the bankbook or the cash or credit card of the payer, and the ATM senses the 2D code instead of the prior OCR codes. The financial institution converts the sensed 2D code information into OCR codes, and provides the code to FTCI using wireless or wire communication method. Since the bill for payment using 2D code is much lower in failure rate when the ATM reads out the OCR code, in comparison with the prior method using the OCR codes (generally, in case of using the OCR codes, 3% or more damage makes the read-out of the code impossible, but in case of using the present-known 2D code, even 37% damage can read-out various kinds of information successively.), even in case that the payment receipt is done not directly by the receiving teller but by the ATM, the failure rate for receipt can be considerably reduced.

However, although using the method, eventually, information sensed from the ATM is interpreted into the OCR codes and transmitted to the FTCI, and the OCR codes are interpreted by the FTCI so that proper information is transmitted to the financial institution and the payee, respectively. Consequently, there still remained the problems of such as duplicate fee both to the financial institution and the FTCI, requiring a long time until the money paid is transferred to the payee, and a risk of misdelivery of the bill due to mail delivery.

Further, in case of the payment receipt method using the OCR codes or the 2D code, since after the payment receipt, the financial institution provides the payee only the personnel details and total money paid of the respective payers, the payee cannot obtain information on what item did the payer pay. That is, the payee cannot obtain detail information of the payer, for example, on whether or not the payer who is a few months behind in his dues paid only a portion of the payment amount and on whether or not with the payment the arrearage has been completely released. Accordingly, in order for the payee to obtain detail payment information on the respective payers, the payee should proceed a step of inputting information written to the OCR card and information on the payer and the amount of payment which is informed from the financial institution, again into a database, and sorting the same, which however is a time and labor-consuming working, causing the expenses of the payer, i.e., the business taxpayer, to be increased.

Furthermore, generally, the sellers or service provider tries to improve efficiency of their company by utilizing a variety of management programs, for example, such as tax accounting programs, which calculate and record information on such as sales, tax amount, advance payments, liabilities and so on. However, since the payment receipt system and the management system in the prior art are not linked with each other, the sellers or the service provider (the payee) has directly inputted information on the amount of money paid by the payer, i.e., information on sales, into the management program, and the management program has outputted various information on which the business taxpayer demands using the inputted information. This method of direct input of various information into the management program makes the time and expense increased, and causes various problems such as information input errors.

SUMMARY OF THE INVENTION

The present invention is provided to solve the problems of the above mentioned payment receipt system of the prior art, and an object of the present invention is to provide a payment receipt system capable of minimizing a fee that a payee has to pay to other financial institution.

Another object of the present invention is to provide a payment receipt system capable of providing a payee with the money paid as quickly as a payer pays for goods or services.

Still another object of the present invention is to provide a payment receipt system capable of transmitting a bill for payment in a method other than mail delivery, which has little risk of misdelivery and carries out a delivery at a low expense.

Yet still another object of the present invention is to provide a payment receipt system which allows a payee to effectively obtain and sort various information on a payer, thereby reducing the time and expenses required for obtaining and sorting the same.

Yet still another object of the present invention is to provide a payment receipt system in which payer information provided to a payee is directly inter-worked with a management program, thereby reducing the time and expenses required for operating the management program.

Yet still another object of the present invention is to provide a payment receipt method using the above payment receipt system.

In order to accomplish the above objects of the present invention, according to a first embodiment of an aspect of the present invention, there is provided a payment receipt system comprising: a receipt management database for managing at least information on payers who have to pay and payment amount that the respective payers have to pay for a certain period; and a payee server including an information extracting part for extracting information including the information on the payers and the payment amount from the receipt management database, a code converting part for converting the extracted information into a two-dimensional (2D) code, a bill forming part for making out a bill for payment with the converted 2D code attached thereto, a bill transmitting part for transmitting the bill for payment to a receiver of the payer, and a controller receiving information on the payers who have completed a payment from a financial institution server.

In accordance with a second embodiment of the present invention, there is provided a payment receipt system comprising: a receipt management database for managing at least information on payers who have to pay and payment amount that the respective payers have to pay for a certain period; and a payee server including an information extracting part for extracting information including the information on the payers and the payment amount from the receipt management database, a code converting part for converting the extracted information into a two-dimensional (2D) code, a bill forming part for making out a bill for payment with the converted 2D code attached thereto, a bill transmitting part for transmitting the bill for payment to a receiver of the payer, and a controller receiving information on the payers who have completed a payment from a financial institution server via a relay server.

In accordance with a third embodiment of the present invention, there is provided a payment receipt system comprising: a receipt management database for managing at least information on payers who have to pay and payment amount that the respective payers have to pay for a certain period; and a payee server including an information extracting part for extracting information including the information on the payers and the payment amount from the receipt management database, a code converting part for converting the extracted information into a two-dimensional (2D) code, a bill forming part for making out a bill for payment with the converted 2D code attached thereto, a bill transmitting part for transmitting the bill for payment to a receiver of the payer, and a controller receiving information from a management server, wherein the data received from the management server is re-processed information of information on the payer who have completed the payment, which is provided from the financial institution server to the management server via a relay server.

In accordance with a forth embodiment of the present invention, there is provided a payment receipt system comprising: a receipt management database for managing at least information on payers who have to pay and payment amount that the respective payers have to pay for a certain period; and a payee server including an information extracting part for extracting information including the information on the payers and the payment amount from the receipt management database, a code converting part for converting the extracted information into a two-dimensional (2D) code, a bill forming part for making out a bill for payment with the converted 2D code attached thereto, a bill transmitting part for transmitting the bill for payment to a receiver of the payer, and a controller receiving information on the payers who have completed the payment from a financial institution server via a relay server, providing the received information on the payers to a management server, and receiving re-processed information of the received information in a certain form from the management server.

In exemplary embodiments of the present invention, when an automated teller machine (ATM) is provided with the bill for payment and payment means from the respective payers, and scans and decodes the 2D code of the bill, the financial institution server may implement a payment process using the decoded information provided from the ATM and payment means, and transfers the paid payment amount to an account of the payee.

In the first exemplary embodiment of the present invention, the payer information provided from the financial institution server to the controller may be either the 2D code attached to the bill for payment or decoded information of the 2D code attached to the bill for payment.

In the second exemplary embodiment of the present invention, the payer information provided from the financial institution server to the relay server may be either the 2D code attached to the bill for payment or decoded information of the 2D code attached to the bill for payment. Preferably, the information provided from the relay server to the controller may be optionally processed in the relay server.

In the second exemplary embodiment of the present invention, the receiver of the payer may be either an e-mail or mobile communication terminal, which includes a storage section storing therein the bill received for payment.

In the exemplary embodiments of the present invention, the payment means may be at least one of a bankbook, a credit card, and a cash card.

In the exemplary embodiments of the present invention, the financial institution server may further include means for identifying a user of the payment means.

In the exemplary embodiments of the present invention, when the payee server has not been provided with payer information until the payment due date, the payee server may further carry out a function of making out a notice of arrears, and transmitting the notice of arrears to the receiver of the payer.

In an exemplary embodiment of the present invention, the ATM may further include means for making out a receipt for payment when the payment process has been completed by the financial institution server.

In accordance with a first embodiment of another aspect of the present invention, there is provided a method for payment receipt comprising the steps of: extracting required information including information on payers and payment amount from a receipt management database for managing information on the payers who have to pay and the payment amount that the respective payers have to pay for a certain period; converting the extracted information into a two-dimensional (2D) code, making out a bill for payment with the converted 2D code attached thereto, transmitting the bill for payment to a receiver of the payer, and receiving information on the payers who have completed the payment process from a financial institution server.

In accordance with a second embodiment of another aspect of the present invention, there is provided a method for payment receipt comprising the steps of: extracting required information including information on payers and payment amount from a receipt management database for managing information on the payers who have to pay and the payment amount that the respective payers have to pay for a certain period; converting the extracted information into a two-dimensional (2D) code, making out a bill for payment with the converted 2D code attached thereto, transmitting the bill for payment to a receiver of the payer, and receiving information on the payers who have completed the payment process from a financial institution server via a relay server.

In accordance with a third embodiment of another aspect of the present invention, there is provided a method for payment receipt comprising the steps of: extracting required information including information on payers and payment amount from a receipt management database for managing information on the payers who have to pay and the payment amount that the respective payers have to pay for a certain period; converting the extracted information into a two-dimensional (2D) code, making out a bill for payment with the converted 2D code attached thereto, transmitting the bill for payment to a receiver of the payer, receiving information a management server, wherein the information received from the management server is re-processed information of the information on the payer who have completed the payment process, which is provided from the financial institution server to the management server via a relay server.

In accordance with a forth embodiment of another aspect of the present invention, there is provided a method for payment receipt comprising the steps of: extracting required information including information on payers and payment amount from a receipt management database for managing information on the payers who have to pay and the payment amount that the respective payers have to pay for a certain period; converting the extracted information into a two-dimensional (2D) code, making out a bill for payment with the converted 2D code attached thereto, transmitting the bill for payment to a receiver of the payer, receiving information on the payers who have completed the payment process from a financial institution server via a relay server, providing the payer information received from the relay server, to a management server, and receiving re-processed information of the received information in a certain form by the management server.

In an exemplary embodiment of the present invention, in the payment process, the steps of comparing the payment amount that the respective payers have to pay for a certain period among decoded information with the total amount payable from payment means; when the payment amount is the same as or less than the total amount, subtracting the money corresponding to the payment amount from payment means and displaying a screen of the ATM a message informing of a normal completion of payment; and when the payment amount is greater than the total amount, displaying the screen a message informing of payment disable may be carried out.

In accordance with the above constructions of the present invention, when making out a bill for payment, a procedure of assigning an OCR code from an authorized institution, e.g. FTCI is eliminated so that a fee to be additionally paid to the FTCI can be saved. In addition, a bill for payment is transmitted by wireless, wire communication means, and did not use expensive OCR sheets and ink, so that imprinting expenses can be minimized.

Further, a procedure is eliminated, in which a financial institution provides FTCI with an OCR card after the payment by a payer, and the FTCI reads-out the OCR card and provides the decoded information on a payee, a payer and so on to the financial institution in return, so that the payment for goods or services can be provided to the payee as soon as possible.

Further, a bill for payment is transmitted using wireless, wire communication means, so that a payment receipt system and method can be provided which have little risk of misdelivery and spend delivery expenses to the minimum.

Further, a payee can effectively obtain and sort required information on a payer, thereby saving the time and expenses required for obtaining and sorting the information. Furthermore, payer information provided to a payee is directly interworked with a management program, thereby saving the time and expenses required for operating the management program.

DETAILED DESCRIPTION OF THE PREFERRED EMBODIMENTS

Hereinafter, a payment receipt system and method of the invention will be described in detail with reference to the accompanying drawings.

Figure 1:
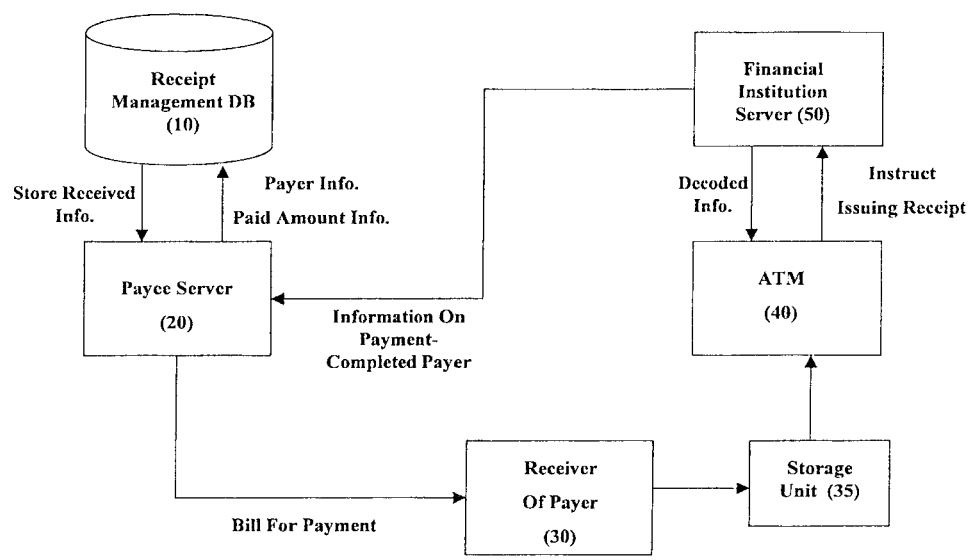
FIG. 1 is a schematic block diagram illustrating a construction of a payment receipt system according to a first embodiment of the present invention.

FIG. 1 is a schematic block diagram illustrating a payment receipt system according to a first embodiment of the present invention. As illustrated in FIG. 1, a payment receipt system according to the first embodiment of the invention includes a receipt management database 10, a payee server 20, a receiver 30 of a payer, an automated teller machine (ATM) 40, and a of a financial institution server 50.

Figure 2:
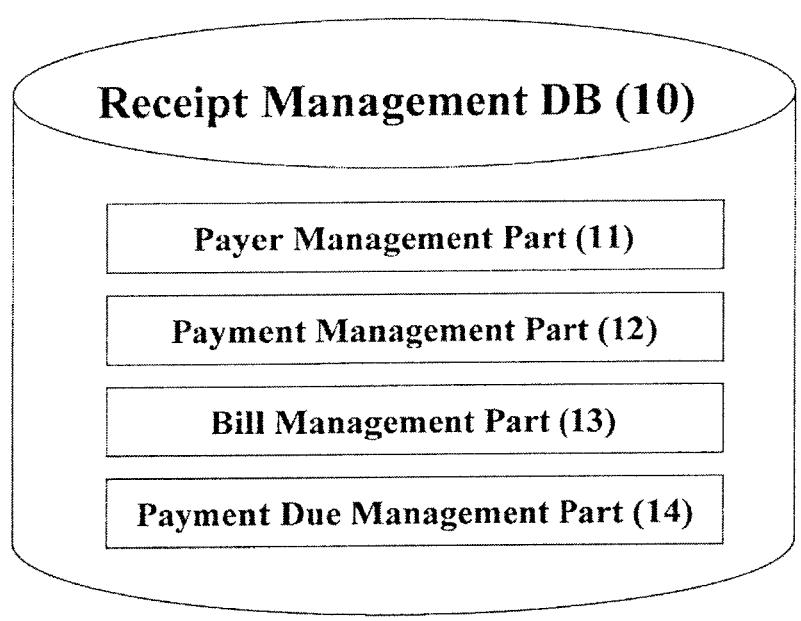
FIG. 2 is a schematic block diagram illustrating a construction of a receipt management database in the payment receipt system of FIG. 1.

First, as illustrated in FIG. 2, the receipt management database 10 consists of a payer management part 11, a payment management part 12, a bill management part 13, and a payment due management part 14. The payer management part 11 stores personal information on the respective payers, for example, a name, an ID, a password, an address, receiver means for a bill for payment, and so on. The payment management part 12 stores the amount or time that the respective payers stored in the payer management part 11 have used goods or services for a certain period of time, reference information of charges, and information on the payment amount to be asked the respective payers, such as an payment amount that the respective payers have to pay until the payment due, arrears amount before this payment due, and so on. The bill management part 13 stores information concerned with the bill for payment, such as the date of issuing the bill for payment, or the notice of arrears if the payer does not pay the payment amount within the payment due. The payment due management part 14 stores the payment date that the respective payers have promised to pay the payment due.

Figure 3:
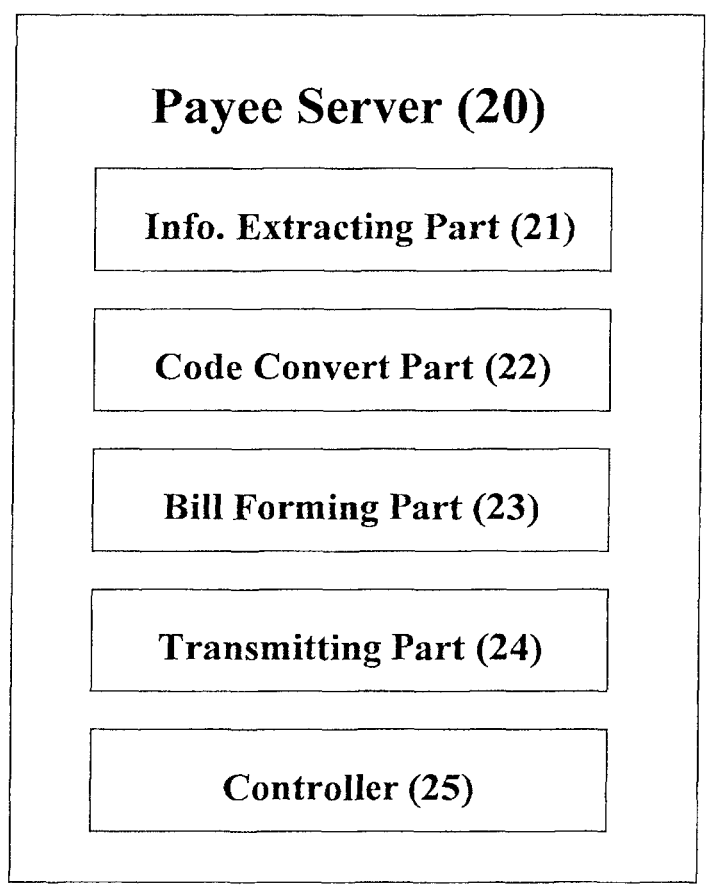
FIG. 3 is a schematic block diagram illustrating a construction of a payee server in the payment receipt system of FIG. 1.

As illustrated in FIG. 3, the payee server 20 includes an information extracting part 21 for extracting information including payers and an payment amount from the receipt management database 10, a code converting part 22 for converting the extracted information into a two-dimensional (2D) code, a bill forming part 23 for making out a bill for payment with the converted 2D code attached thereto, a bill transmitting part 24 for transmitting the bill from the payee server 20 to a receiver 30 of the payer, and a controller 25.

Accordingly, in case that a bill for payment is set to be issued, for example, ten days before the payment due of the payer, the information extracting part 21 of the payee server 20 extracts a list of payers whose payment due is left 10 days from the payment due management part 14 of the receipt management database 10. Further, the information extracting part 21 extracts information required for making out the bill for the payers included in the list of payers from the payer management part 11 and payment management part 12 of the database 10. For example, the extracting part 21 extracts information on names, IDs, and receiver means for the bill of the payers from the payer management part 11, and further extracts the payment amount that the respective payers have to pay within the payment due from the payment management part 12.

Then, the code converting part 22 of the server 20 converts the extracted information on the payers, the payment amount, and the payment due into a two-dimensional (2D) code. The converted 2D code may be for example, QR code, U1 code, PDF 147, and the like, but it is not limited thereto.

Next, the bill forming part 23 of the server 20 makes out a bill for payment onto which the 2D code formed from the code converting part 22 is attached. It is preferable that in addition to the 2D code converted by the above method, the bill for payment includes information on the payer, the payment amount, and the payment due in text type, in order for the payer to easily identify whether or not the bill for payment is concerned with him and how much amount is requested of him when he sees the bill for payment. Also, in order for the payer to recognize the bill for payment when transmitted to the receiver 30 of the payer via wireless, wire communication network, the bill for payment may be made out in a language suitable to a format applied to the receiver 30 of the payer, for example, html, xhtml, mhtml, shtml, wml, and so on, but the language is not limited thereto. In the first embodiment, although the bill for payment has been described to be provided to the payer in on-line method using wireless, wire communication means, the bill for payment can be transmitted to the payer in off-line method using conventional mail.

Then, the bill transmitting part 24 of the payee server 20 transmits the bill for payment made out by the bill forming part 23 to the receiver 30. That is, the bill transmitting part 24 is connected with the receiver 30 of the payer via wireless, wire communication network, and transmits the bill made out by the bill forming part 23 to the receiver 30. As transmitting means, communicating services such as using e-mail or mobile communication terminal can be generally utilized while using information on the receivers of the respective payers who are requested by the payers and stored in the receipt management database 10. Preferably, when the receiver 30 receives the bill and transmits a receipt message to the payee server 20, the transmitting part 24 informs the controller 25 of the receipt message so that the controller 25 stores the same in the receipt management database 10. Further, after the transmission of the bill for payment to the receiver 30 of the payer, the controller 25 preferably informs the bill management part 13 of transmission information, and the management part 13 records the information. Further, as described later, after the successful procedure of payment in the financial institution server 50, the controller 25 is provided with information on the payers who have completed the payment procedure from the financial institution server 50, and records the payer information in the payment management part 12 of the receipt management database 10.

Further, the payment receipt system according to the embodiments of the invention preferably transmits a notice of arrears to a receiver 30 of the payer who has not completed a payment procedure within the payment due.

Specifically, as described later, after the successful payment procedure in the financial institution server 50, the controller 25 is provided with information on the payers who have completed the payment procedure from the financial institution server 50, and the provided information provided is recorded in the payment management part 12 of the receipt management database 10. Then, the information extracting part 21 of the payee server 20 extracts everyday the list of payers whose payment due has expired the day before from the payment due management part 14 of the receipt management database 10. Then, the controller 25 identifies the payers who have not completed the payment procedure by comparing the list of the payers with the information on the payer provided to the server 50. Then, the information extracting part 21 extracts, from the payer management part 11 and payment management part 12 of the database 10, information on the payers who have not completed the payment procedure among the payers extracted from the payer management part 11, and on the unpaid amount. Similar to the above-mentioned procedure of transmitting the bill for payment to the receiver 30, the code converting part 22 of the server 20 converts the list of payers who have not paid, and information on the payers and the payment amount into a 2D code, the bill forming part 23 makes out a notice of arrears onto which the 2D code is attached, and the information transmitting part 24 transmits the notice of arrears to the receiver 30. Meanwhile, although in this embodiment, information on payers in arrears the day before is extracted every day and the notice of arrears is made out, the notice of arrears can be made out according to a period such as three days, a week, two weeks and so on, that the payee may optionally determine.

Preferably, the payment receipt system according to the first embodiment may transmit a reminder to the receiver 30 of the payer who have not completed the payment procedure till the certain date before the payment due, either instead of or together with transmitting the notice of arrears. For example, similar to the procedure of forming the notice of arrears, the information extracting part 21 of the payee server 20 extracts every day the list of payers whose payment due will expire the next day from the payment due management part 14 of the receipt management database 10. Then, the controller 25 identifies the payer who has not completed the payment procedure. Then, the information extracting part 21 extracts, from the payer management part 11 and payment management part 12 of the database 10, information on the payers who have not yet completed the payment procedure among the payers extracted from the payment due management part 14, and on the unpaid amount. Then, the bill forming part 23 makes out a reminder of the payment due, and transmits it to the receiver 30. The notice for informing of the payment due is one for allowing the payers to be recognized the payment due, so that the notice may be made out in a common document format without essentially proceeding a procedure of forming a 2D code in the code converting part 22.

Further, as the receiver 30 of the payer, e-mails, mobile communication terminals, or PDAs may be generally used, and when a bill for payment is transmitted to the receiver 30 that is previously designated by the payer, the receiver 30 checks the bill and stores the bill in a storage unit 35. The storage unit 35 may be a hard disk of a personal computer of the payer, a removable storage media such as a floppy disk, a storage device included in a mobile communication terminal.

Figure 4:
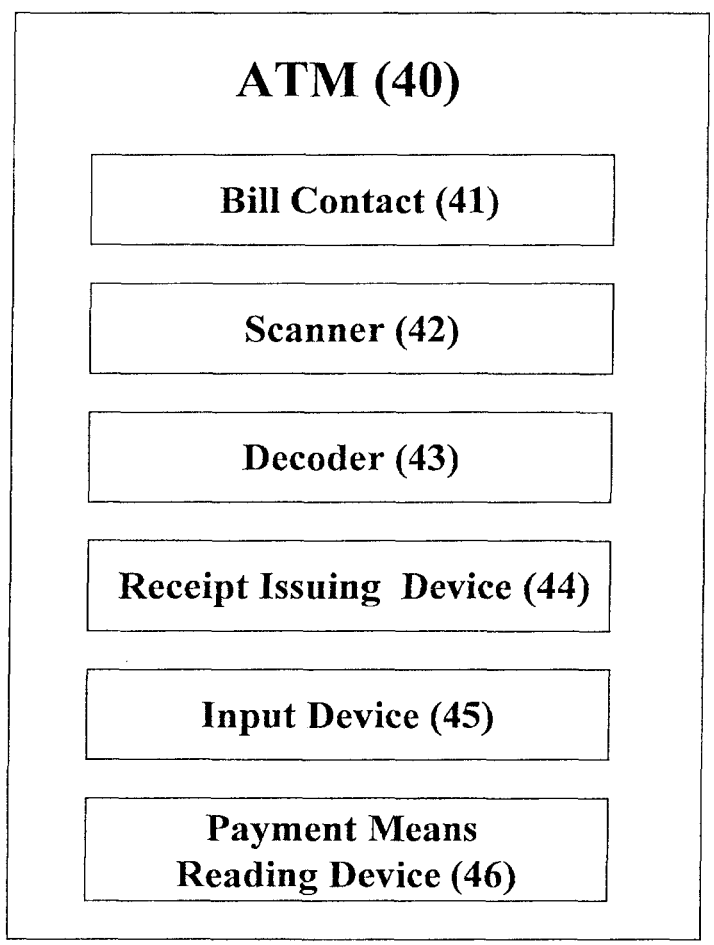
FIG. 4 is a schematic block diagram illustrating a construction of an automated teller machine (ATM) in the payment receipt system of FIG. 1.
Figure 5:
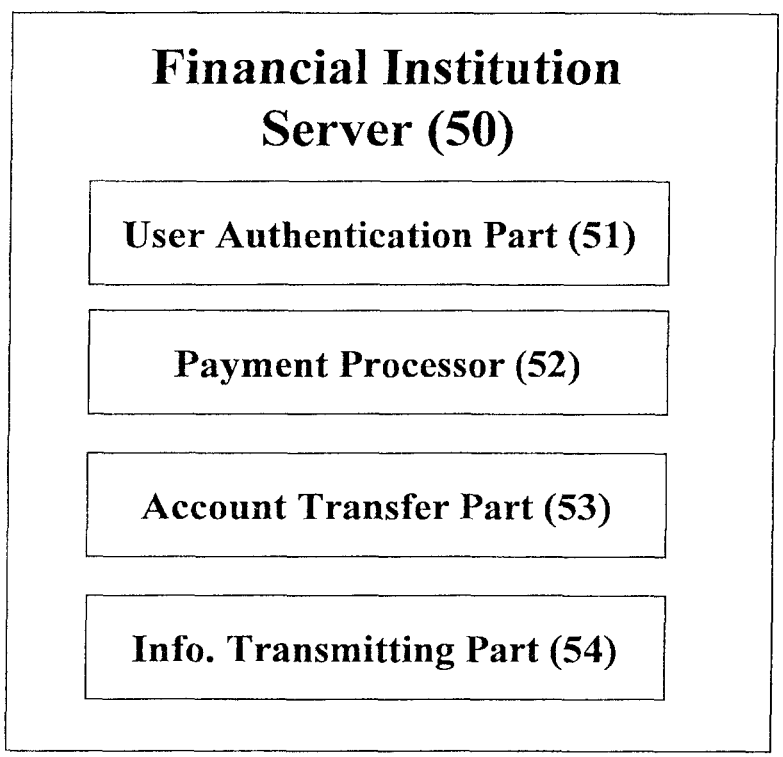
FIG. 5 is a schematic block diagram illustrating a construction of the server of a finatial institution in the payment receipt system of FIG. 1.

FIG. 4 illustrates an exemplary construction of an automated teller machine (ATM) 40 according to a first embodiment, and FIG. 5 illustrates an exemplary construction of a financial institution server 50 according to a first embodiment.

In FIG. 4, the ATM 40 includes a bill contact 41, a scanner 42, a decoder 43, a receipt issuing device 44, a input device 45, and a payment means reading device 46. The bill contact 41 is a part of the ATM 40 with which a bill for payment comes in contact so as for the ATM to recognize the bill, particularly, a 2D code, stored in the storage unit 35. For example, in case that a bill for payment is stored in a computer, the bill may be printed by output means such as a printer and so on, and the 2D code portion of the printed bill may be brought into contact with the bill contact 41. Further, in case that a bill for payment is stored in a mobile communication terminal, a 2D code may be displayed on a screen of the terminal, and the screen may be brought into contact with the bill contact 41. The scanner 42 scans the 2D code contacted with the bill contact 41, and provides the scanned 2D code image to the decoder 43. The decoder 43 decodes the scanned 2D code into information on the payers, the payment amount, and the payment due. The decoded information is provided to the financial institution server 50, together with user information of payment means, such as bankbook, credit card, cash card, and so on, that the payer inputs via the payment means reading device 46. After the completion of settlement for the payment amount in the financial institution server 50 described later, the receipt issuing device 44 prints and outputs a receipt for allowing the payer to be informed that a payment procedure has been successively completed. The input device 45 includes an operating button and so on, and serves to input means for inputting for example, a password for user identification.

In FIG. 5, the financial institution server 50 includes a user authentication part 51, a payment processor 52, an account transfer part 53, and an information transmitting part 54. The user authentication part 51 checks whether or not payment means is provided by a valid user when user information of payment means is provided from the ATM 40. User authentication method will be described later in detail. The payment processor 52 of the financial institution server 50 compares the payment amount of the payer among information decoded from the decoder 43 with the total amount payable from payment means, and if the payment amount is the same as or less than the total amount, clears the amount corresponding to the payment due from payment means. The account transfer part 53 transfers the amount of settled bill to a payee's account (not shown). The transfer can be done either immediately after the respective payers pay the payment due, or periodically (for example, daily, monthly and so on) after sorting into the amounts to be transferred to the same payee among the money paid by many payers, and putting them together. The information transmitting part 54 instructs the receipt issuing device 44 of the ATM 40 to issue a receipt for certificating that the payer has paid the payment. Also, after the payment settlement, the information transmitting part 54 transmits information on the payers who have paid the payment amount to the controller 25 of the payee server 20.

Figure 6:
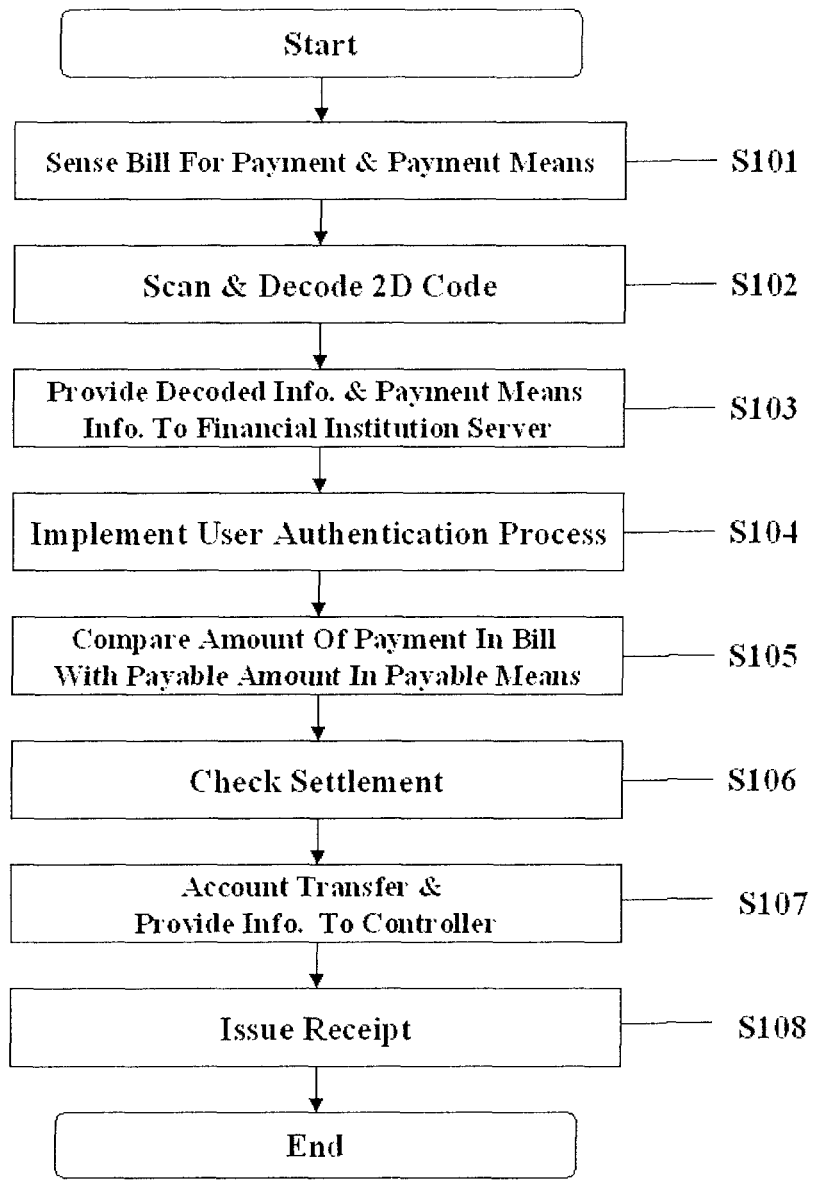
FIG. 6 is an exemplary flow chart illustrating an operation between an ATM and the server of a financial institution in a payment receipt system according to a first embodiment of the present invention.

Hereinafter, an operation between the ATM 40 and the financial institution server 50 as constructed in FIGS. 4 and 5 will be described with reference to a flow chart of FIG. 6. FIG. 6 is an exemplary flow chart illustrating a procedure implemented in the ATM 40 and the financial institution server 50.

First, a first step S101 is comprised of inputting payment means such as a bankbook, a credit card, or a cash card into the payment means reading device 46 of the ATM 40, and simultaneously contacting a bill for payment to the bill contact 41 of the ATM 40. Since the construction of the payment means reading device 46 is the same as that of a conventional cash dispenser or other bank teller machine, the description thereof will be omitted. The contact method may be conducted so that in case that the bill for payment is stored in a computer and the like, the bill for payment is printed and outputted using output means such as a printer, a 2D code portion of the outputted bill is brought into contact with the bill contact 41, and in case that the bill for payment is stored in a mobile communication terminal, the 2D code is displayed on the screen of the terminal, and the screen is brought into contact with the bill contact 41.

When the bill for payment is brought into contact with the bill contact 41, the scanner 42 scans the 2D code part in the bill for payment contacted with the bill contact 41 and provides the decoder 43 with scanned 2D code image. The decoder 43 then decodes the scanned 2D code into information on the payer, the payment amount, and the payment due (a second step S102).

Then, the decoded information and user information on the payment means are provided to the financial institution server 50 (a third step S103). Herein, it is not required that the payer of decoded information and the user (i.e., a nominal person of bankbook, credit card and so on) of the payment means should be the same person.

When the user authentication part 51 of the server 50 is provided with the user information on payment means from the ATM 40, it is checked whether or not payment means is provided by the authorized user (a fourth step S104). The check on the authorized user can be determined for example by getting a payer to input a password using an input device, such as a keypad and touch screen, and checking whether or not the inputted password is in accord with a password predetermined in the payment means. If the password is in accord with the predetermined password, a further payment process proceeds continuously, and if it is not accord with the predetermined, the payment process does not proceed to the next step and is terminated. The known user authentication method other than the password input can also be used as the user authentication method of the present invention.

Then, the payment processor 52 of the financial institution server 50 compares the payment amount that the payer has to pay in the decoded information with the total amount payable from the payment means (a fifth step S105). Further, if the payment amount is the same as or less than the total payable amount, the payment processor may either settle the payment amount, or preferably checks once more whether the payer truly wants to pay the payment amount by displaying a notice such as "to Press 'enter' button if you want to pay $OOO" after displaying information on the payment amount, payer, and user of payment means on a screen of the ATM 40 (a sixth step S106). Otherwise, if the payment amount is greater than the total payable amount, the payment processor 52 preferably indicates that there is not enough money in the account of inputted payment means to settle the payment amount, such as by displaying "short of money" on the screen of the ATM 40. In case of being short of money, the financial institution server 50 may request for input of another payment means, or otherwise may terminate a procedure. Alternatively, in case that the payable amount is less than the payment amount, the payee may settle up to the payable amount, and only the remainder may be maintained as the amount unpaid.

With successful settlement, the account transfer part 53 transfers the amount of settled bill to a payee's account (not shown), and the information transmitting part 54 transmits information on the payers who have paid the payment amount to the controller 25 of the payee server 20 (a seventh step S107). The transfer can be done either immediately after the respective payers pay the payment due, or periodically (for example, daily, monthly and so on) after sorting into the amounts to be transferred to the same payee among the money paid by many payers, and putting them together.

Meanwhile, although the payer information transmitted to the controller 25 may include the payment amount and basic personal information required to identify the payers, all information recorded in the 2D code that the payers provide can be provided to the controller 25 in a format before or after decoding. If only basic personal information on the payers and the payment amount is provided to the controller 25, a separate sorting working should be done so as to check information on a paying status, arrears and so on of the respective payers. However, if all information is inputted at once to the controller 25, it can immediately record how much and for which item the payers have paid, without such sorting working, thereby saving the time and expenses.

After the seventh step S107, the information transmitting part 54 instructs the receipt issuing device 44 of the ATM 40 to print a receipt for payment certifying that the payer has paid the payment amount, and the receipt issuing device 44 then prints the receipt for payment (a eighth step S108). The receipt for payment is outputted outside of the ATM, so that the payer can directly receive the receipt, or if the decoded payer information includes mobile phone number or e-mail address, the payer can receive the receipt for payment through the mobile communication terminal or the e-mail using wireless, wire communication means. The eighth step S108 may be implemented before the seventh step depending on a system of the financial institution.

Figure 7:
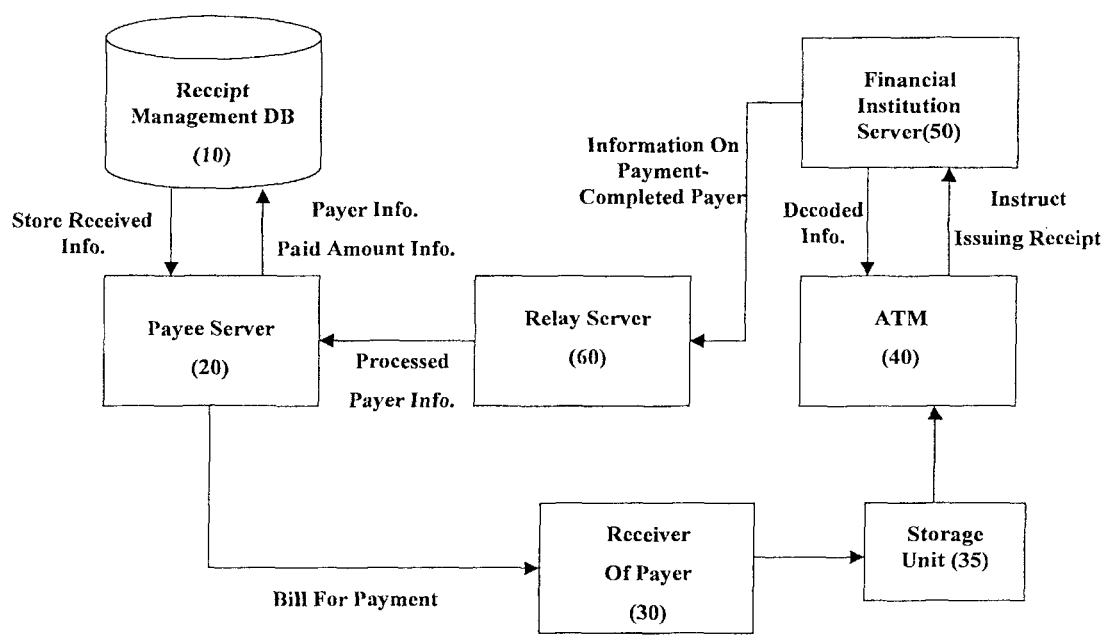
FIG. 7 is a schematic block diagram illustrating a construction of a payment receipt system according to a second embodiment of the present invention.

FIG. 7 is a schematic block diagram illustrating a construction of a payment receipt system according to a second embodiment of the present invention. In FIG. 7, like numerals refer to like parts in FIGS. 1 to 6, so that the detailed description thereof will be omitted.

As illustrated in FIG. 7, in the payment receipt system according to a second embodiment, the financial institution server 50 transmits information on payer, a payment amount, a payment due and so on to the relay server 60 after the settlement by the financial institution server 50. Then, the relay server 60 sorts the provided information and transmits the sorted information to the controller 25 of the payee server 20. Although information provided from the financial institution server 50 includes only basic personal information and a payment amount of the payer, the information may preferably include all recorded in the 2D code, and provide the controller with information in a state before or after decoding. The relay server 60 selects information which the payee wants to obtain, such as personal details of the payer, the money paid, paid date, the unpaid amount if it exists, and so on, among the information provided from the financial institution server 50, and transmits the selected information to the controller 25 of the payee server 20.

Figure 8:
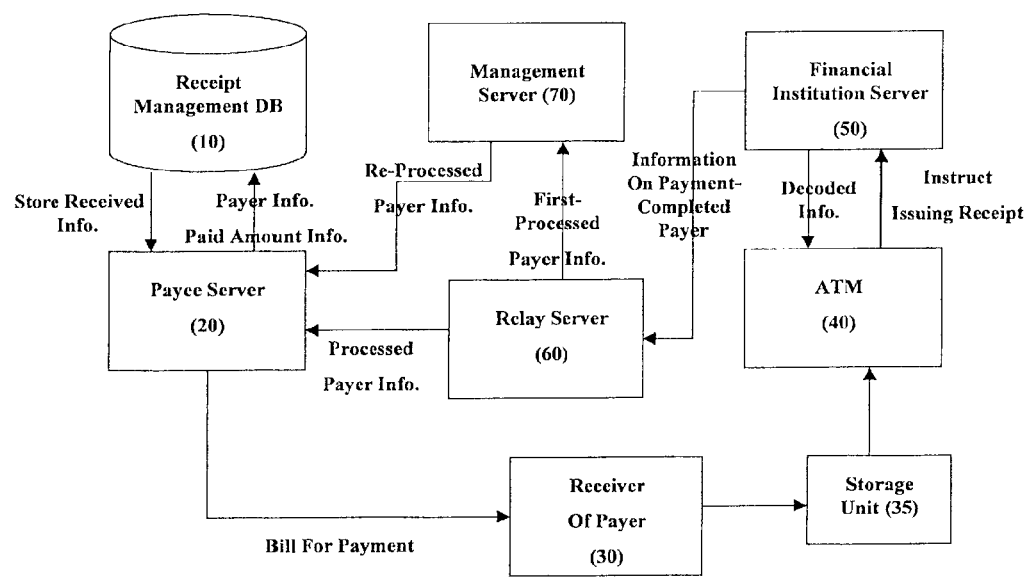
FIG. 8 is a schematic block diagram illustrating a construction of a payment receipt system according to a third embodiment of the present invention.

FIG. 8 is a schematic block diagram illustrating a construction of a payment receipt system according to a third embodiment of the present invention. In FIG. 8, like numerals refer to like parts in FIGS. 1 to 7, so that the detailed description thereof will be omitted.

Similar to the second embodiment, the payment receipt system illustrated in FIG. 8 includes a relay server 60 which receives information on payer, a payment amount, a payment due and so on, after the settlement by the financial institution server 50. Then, the relay server 60 sorts the provided information, and transmits the sorted information to the controller 25 of the payee server 20. In addition, the system further includes a management server 70. The management server 70 receives all of or a portion of various information on the payers provided from the financial institution server 50 to the relay server 60, re-processes the received information in information form that the payee wants to obtain, and transmits the re-processed information to the payee server 20. For example, the management server 70 re-processes the amount received by the date, payee's sales for a certain period, various accounts/tax affairs information such as the total amount of sales tax, information on the payers who have the great amount in arrears, and so on, using the payer information provided from the relay server 70. Then, the management server 70 transmits the re-processed information to the payee server 20, so that the payee server can effectively manage information on the accounts and payers.

Figure 9:
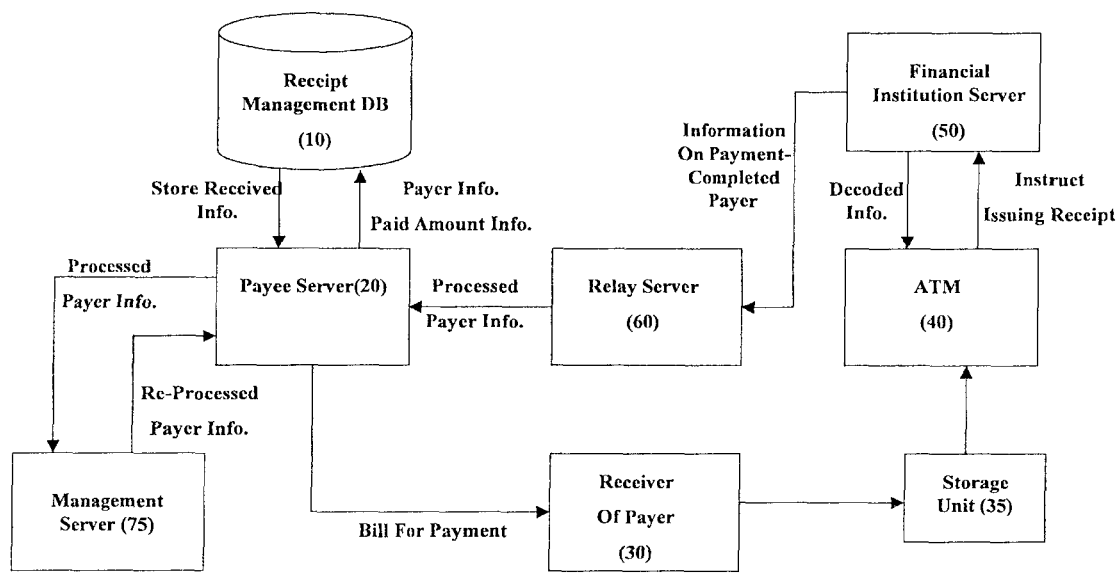
FIG. 9 is a schematic block diagram illustrating a construction of a payment receipt system according to a forth embodiment of the present invention.

FIG. 9 is a schematic block diagram illustrating another construction of the payment receipt system according to the third embodiment of the present invention. As illustrated in FIG. 9, the payment receipt system has the same construction and function as those of FIG. 8, excluding that payer information is provided from the relay server 60 to the management server 70 via the payee server 20.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A method for payment receipt between a payee which provides a service and a payer which pays for the provided service, the method comprising the steps of:

extracting by a payee server of the payee, required information including information on payers including the payer and payment amounts of the payers from a receipt management database for managing information on the payers who have to pay and the payment amounts that the respective payers have to pay for a certain period of time, wherein the payee server directly issues, to the payer, a bill for payment for the service of the payee;

converting by the payee server, the extracted information into a two-dimensional (2D) code;

making out by the payee server, the bill for payment with the converted 2D code attached thereto;

transmitting by the payee server, the bill for payment with the 2D code to a receiver of the payer;

receiving by the payee server, a receipt message from the receiver of the payer; and receiving by the payee server, processed payer information from a relay server, wherein the relay server receives information on payers who have completed a payment process and on payments of the payers who have completed the payment process, transmitted from a financial institution server and selects information including a paid amount, a paid date, and personal details of a payer, which the payee wants to obtain, among the received information thereby to provide the processed payer information to the payee server.

2. A method for payment receipt between a payee which provides a service and a payer which pays for the provided service, the method comprising the steps of:

extracting by a payee server of the payee, required information including information on payers including the payer and payment amounts of the payers from a receipt management database for managing information on the payers who have to pay and the payment amounts that the respective payers have to pay for a certain period of time, wherein the payee server directly issues, to the payer, a bill for payment for the service of the payee;

converting by the payee server, the extracted information into a two-dimensional (2D) code, making out by the payee server, the bill for payment with the converted 2D code attached thereto, transmitting by the payee server, the bill for payment with the 2D code to a receiver of the payer, receiving by the payee server, a receipt message from the receiver of the payer, receiving by the payee server, processed payer information from a relay server, wherein the relay server receives information on payers who have completed a payment process and on payments of the payers who have completed the payment process, transmitted from a financial institution server, and selects information including a paid amount, a paid date and personal details of a payer, which the payee wants to obtain, among the received information thereby to provide the processed payer information to the payee server, and receiving by the payee server, re-processed information from a management server, wherein the management server receives the information on the payers who have completed the payment process and on the payments of the payers who have completed the payment process from the financial institution server via the relay server, and re-processes the received information in an information form that the payee wants to obtain thereby to provide the re-processed information to the payee server.

3. A method for payment receipt between a payee which provides a service and a payer which pays for the provided service, the method comprising the steps of:

extracting by a payee server of the payee, required information including information on payers including the payer and payment amounts from a receipt management database for managing information on the payers who have to pay and the payment amounts that the respective payers have to pay for a certain period of time, wherein the payee server directly issues, to the payer, a bill for payment for the service of the payee;

converting by the payee server, the extracted information into a two-dimensional (2D) code, making out by the payee server, the bill for payment with the converted 2D code attached thereto, transmitting by the payee server, the bill for payment with the 2D code to a receiver of the payer, receiving by the payee server, a receipt message from the receiver of the payer, receiving by the payee server, processed payer information from a relay server, wherein the relay server receives information on payers who have completed a payment process using the transmitted bill with the 2D code and on payments of the payers who have completed the payment process, transmitted from a financial institution server, and selects information including a paid amount, a paid date and personal details of a payer, which the payee wants to obtain, among the received information thereby to provide the processed payer information to the payee server, providing by the payee server, the processed payer information received from the relay server to a management server, and receiving by the payee server, re-processed payer information from the management server, wherein the management server receives the processed payer information, and re-processes the processed payer information in an information form that the payee wants to obtain thereby to provide the re-processed payer information to the payee server.

4. The method for payment receipt as claimed in claim 1, wherein when an automated teller machine (ATM) scans and decodes the 2D code of the bill provided to the receiver of the payer, the financial institution server implements a payment step after receiving the decoded information and the payment means information provided from the ATM, and a transfer step of transferring a paid payment amount of the payer by the payer to an account of the payee.

5. The method for payment receipt as claimed in claim 1, wherein the payer information provided from the financial institution server to the relay server is either the 2D code attached to the bill for payment or decoded information of the 2D code attached to the bill for payment.

6. The method for payment receipt as claimed in claim 1, further comprising making out a notice of arrears when a payee server has not been provided with payer information until the payment due date, and transmitting the notice of arrears.

7. The method for payment receipt as claimed in claim 1, wherein the payment process further comprises the steps of comparing a payment amount that the payer has to pay for a certain period among decoded information with a total amount payable from payment means; if the payment amount is the same as or less than the total amount, subtracting the money corresponding to the payment amount from payment means and displaying a screen of the ATM a message informing of a normal completion of payment; and if the payment amount is greater than the total amount, displaying the screen a message informing of payment disable is implemented.

8. The method for payment receipt as claimed in claim 2, wherein when an automated teller machine (ATM) scans and decodes the 2D code of the bill provided to the receiver of the payer, the financial institution server implements a payment step after receiving the decoded information and the payment means information provided from the ATM, and a transfer step of transferring a paid payment amount of the payer by the payer to an account of the payee.

9. The method for payment receipt as claimed in claim 2, wherein the payer information provided from the financial institution server to the relay server is either the 2D code attached to the bill for payment or decoded information of the 2D code attached to the bill for payment.

10. The method for payment receipt as claimed in claim 2, further comprising making out a notice of arrears when a payee server has not been provided with payer information until the payment due date, and transmitting the notice of arrears.

11. The method for payment receipt as claimed in claim 2, wherein the payment process further comprises the steps of comparing a payment amount that the payer has to pay for a certain period among decoded information with a total amount payable from payment means; if the payment amount is the same as or less than the total amount, subtracting the money corresponding to the payment amount from payment means and displaying a screen of the ATM a message informing of a normal completion of payment; and if the payment amount is greater than the total amount, displaying the screen a message informing of payment disable is implemented.

12. The method for payment receipt as claimed in claim 3, wherein when an automated teller machine (ATM) scans and decodes the 2D code of the bill provided to the receiver of the payer, the financial institution server implements a payment step after receiving the decoded information and the payment means information provided from the ATM, and a transfer step of transferring a paid payment amount of the payer by the payer to an account of the payee.

13. The method for payment receipt as claimed in claim 3, wherein the payer information provided from the financial institution server to the relay server is either the 2D code attached to the bill for payment or decoded information of the 2D code attached to the bill for payment.

14. The method for payment receipt as claimed in claim 3, further comprising making out a notice of arrears when a payee server has not been provided with payer information until the payment due date, and transmitting the notice of arrears.

15. The method for payment receipt as claimed in claim 3, wherein the payment process further comprises the steps of comparing a payment amount that the payer has to pay for a certain period among decoded information with a total amount payable from payment means; if the payment amount is the same as or less than the total amount, subtracting the money corresponding to the payment amount from payment means and displaying a screen of the ATM a message informing of a normal completion of payment; and if the payment amount is greater than the total amount, displaying the screen a message informing of payment disable is implemented.

16. The method for payment receipt as claimed in claim 3, wherein when an automated teller machine (ATM) scans and decodes the 2D code of the bill provided to the receiver of the payer, the financial institution server implements a payment step after receiving the decoded information and the payment means information provided from the ATM, and a transfer step of transferring a paid payment amount of the payer by the payer to an account of the payee.

17. The method for payment receipt as claimed in claim 3, wherein the payer information provided from the financial institution server to the relay server is either the 2D code attached to the bill for payment or decoded information of the 2D code attached to the bill for payment.

18. The method for payment receipt as claimed in claim 3, further comprising making out a notice of arrears when a payee server has not been provided with payer information until the payment due date, and transmitting the notice of arrears.

19. The method for payment receipt as claimed in claim 3, wherein the payment process further comprises the steps of comparing a payment amount that the payer has to pay for a certain period among decoded information with a total amount payable from payment means; if the payment amount is the same as or less than the total amount, subtracting the money corresponding to the payment amount from payment means and displaying a screen of the ATM a message informing of a normal completion of payment; and if the payment amount is greater than the total amount, displaying the screen a message informing of payment disable is implemented.

\* \* \* \* \*